UNITED STATES PATENT OFFICE.

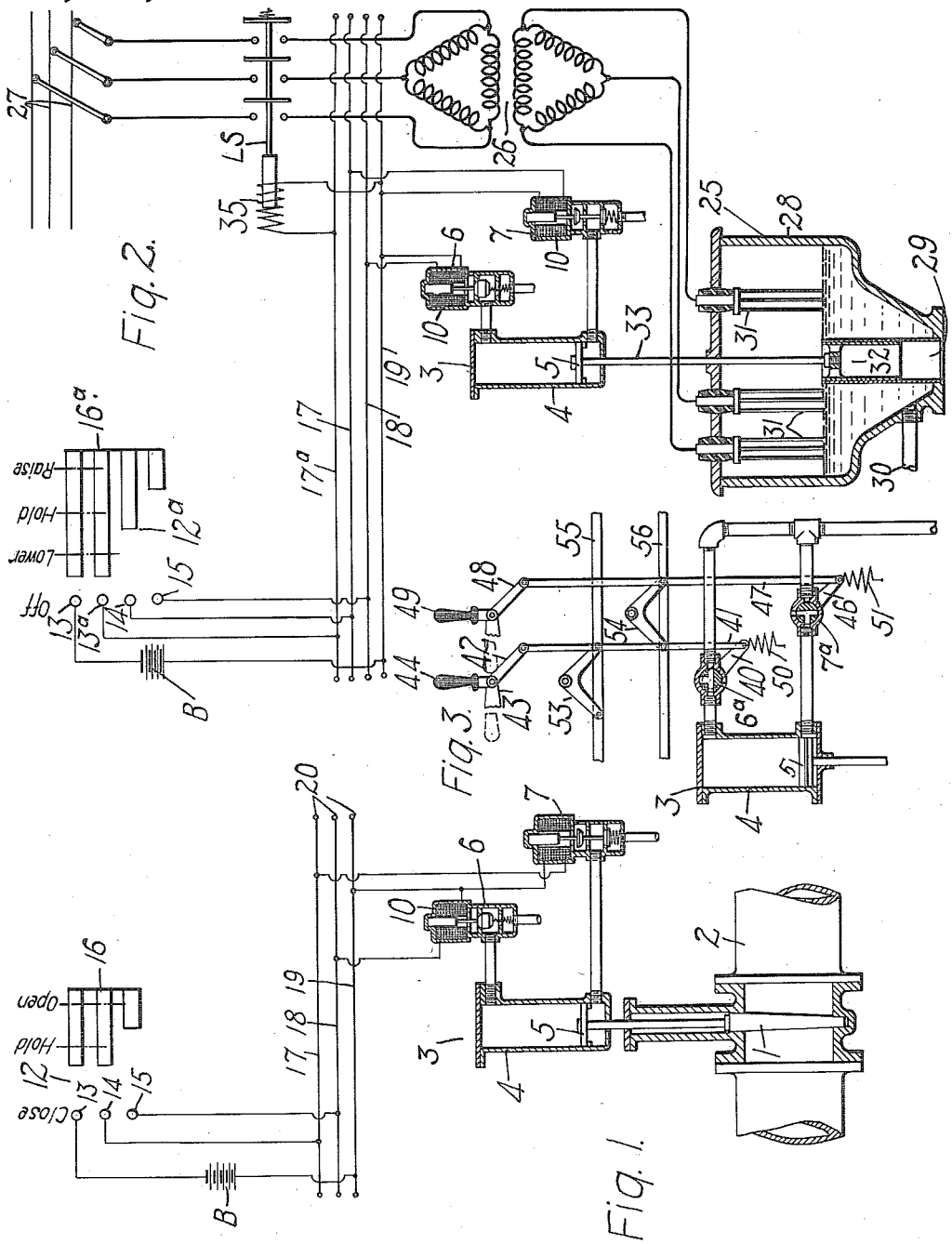

KARL A. SIMMON, OF EDGEWOOD PARK, AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,279,027.  Specification of Letters Patent.  Patented Sept. 17, 1918.

Application filed June 29, 1914. Serial No. 847,858.

*To all whom it may concern:*

Be it known that we, KARL A. SIMMON, a citizen of the United States, and a resident of Edgewood Park, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems, with special reference to systems of the remote-control type which are adapted to govern the operation of fluid-actuated mechanisms.

One of the objects of our invention is to provide simple and effective means for remotely controlling the operation of fluid-actuated devices which may be employed either to govern the operation of electric vehicle motors or for any other purpose in which it is desired to actuate a member in the one or the other direction and to arrest its movement in any position.

A further object of our invention is to provide a reliable system which may be readily installed and maintained at relatively small expense, and which shall embody a minimum number of control circuits, or equivalent means, whereby the possibility of difficulty in operation is practically obviated.

According to our invention, we provide remote control means for governing a fluid-actuated device embodying a movable piston and a coöperating cylinder having valves associated with the respective ends thereof. Said remote-control means either constitutes a master controller having a plurality of definite positions and suitable control circuits and valve-actuating magnets, or it may embody mechanical means of the class employing manually operated levers or handles and interconnecting actuating rods.

In a specific aspect, we contemplate employing means, of the type referred to, for regulating the operation of a polyphase induction motor through the agency of a pneumatically operated liquid rheostat, in which the height of the electrolyte may be regulated at the will of the operator.

In the accompanying drawing, Figure 1 is a diagrammatic view of a system of control embodying our invention; Fig. 2 is a similar view of a modified form of our invention applied to the control of a liquid rheostat; and Fig. 3 is a similar view of a mechanically operated remote-control system which embodies a further modification of our invention.

Referring to Fig. 1 of the drawing, the system shown comprises a movable valve 1 which is adapted to open and close a communication through a pipe 2 which may carry fluid, such as water or steam, for any of a variety of purposes, the valve 1 being associated with a fluid-actuated device 3 comprising a cylinder 4, and a movable piston 5 contained therein and mechanically connected to the valve 1. The cylinder 3 is provided with electrically operated valves 6 and 7 that are adapted to control the admission and release of a suitable operating fluid to and from the respective ends of the cylinder 4. The valves 6 and 7 are of a type familiar in the art, each being provided with an operating electro-magnet 10. The valve 6 is normally maintained in its open position, when deënergized, to admit operating fluid to the upper side of the piston 5, while the valve 7, when deënergized establishes a communication between the lower end of the cylinder 4 and the atmosphere, while cutting off the supply of operating fluid. Under these conditions, an unbalanced condition of pressure exists, which tends to bias the movable piston 5 to its lowermost position.

In order to control the operation of the electrically operated valves 6 and 7, a master controller 12 is employed which embodies a plurality of stationary contact terminals 13, 14 and 15 and a coöperating movable segment 16 which is adapted to engage the terminals in a plurality of definite positions marked "Hold" and "Open." Normally, the conducting segment 16 occupies an off position marked "Close" in which it is out of engagement with the terminals 13, 14 and 15.

In order to adapt the system for multiple unit operation, whereby a plurality of valves similar to the valve 1 may be concurrently and correspondingly regulated, a plurality of conductors 17, 18 and 19, are employed, which conductors correspond in function to the well-known train line conductors of railway control systems and are provided with end connectors or terminals 20 for the purpose of connection with adjacent and similar unit systems, in accordance with well-known practice.

Assuming the various parts of the apparatus and the circuit connections to be as shown, the operation thereof is as follows: If it is desired to open the valve 1, the conducting segment 16 is moved into its "open" position, in which a circuit is established from one terminal of an auxiliary source of energy or battery B through contact terminals 13, conducting segment 16, contact terminal 14, conductor 17, energizing coil 10 of the electrically operated valve 7 and conductor 19 to the other terminal of the auxiliary source of energy B. The valve 7 is thereby actuated to close the communication to the atmosphere and to admit operating fluid to the lower end of the cylinder 4. Thus, balanced pressure conditions obtain on the respective sides of the piston 5 and no movement thereof is effected.

Concurrently, with this operation, however, a circuit is established from contact terminal 13 through conducting segment 16, contact terminal 15, conductor 18, energizing coil 10 of the electrically operated valve 6 and conductor 19 to the source B. The energization of the coil 10 effects the actuation of the valve 6 and causes said valve to cut off the supply of operating fluid to the upper end of the cylinder 4 and to permit its release therefrom to the atmosphere.

As soon as the pressure of the operating fluid above the piston 5 is slightly reduced, unbalanced pressure conditions obtain, and the piston 5 and associated valve 1 are moved upwardly by reason of the excess of pressure acting upon the lower side of the piston. This movement of the piston 5 and valve 1 continues until the piston reaches its upper limit of travel or until the master controller 12 is manipulated to its "hold" position, in which the conducting segment 16 becomes disengaged from the contact terminal 15 and thereby deënergizes the electrically operated valve 6. The valve 6, therefore, is moved to its normal open position to admit operating fluid to the upper end of the cylinder. Balanced pressures acting upon the respective sides of the piston 5 are thus obtained, and the movement of the piston 5 and associated valve 1 is arrested. Obviously, the piston 5 may be brought to rest at any position in its travel, at the will of the operator.

If it be desired to subsequently close the valve 1, the master controller 12 is moved to its off position marked "Close," in which all of the control circuits are interrupted, and the electrically operated valves 6 and 7 are both deënergized. The valve 6 is thus returned to its normal open position, while the valve 7 is returned to its normal closed position, and an unbalanced relation of pressures is produced which effects the downward movement of the piston 5 and valve 1. This movement may be permitted to continue until the valve 1 is completely closed or the movement may be arrested at any time by moving the master controller into its intermediate "hold" position, thereby energizing the electrically operated valve 7 and admitting operating fluid to the under side of the piston 5.

The valve 1 forms no material part of my present invention except as it constitutes a member, the movement of which it is desired to control, and is shown merely as illustrative of a common type of regulatable device.

It is clear, that, if a plurality of control units, such as set forth, be connected in the manner of the usual multiple unit systems, all of the fluid-operated devices will be actuated concurrently.

Reference may now be had to Fig. 2, in which a fluid-operated device 3, similar to the one just described, is employed for governing the action of a liquid rheostat 25 that is employed for controlling the operation of a polyphase induction motor 26, the latter being supplied with energy from a polyphase supply circuit 27 through an electrically operated line switch LS. The liquid rheostat 25 may be of any desired construction and embodies a tank 28 having a bottom discharge opening 29, an inlet opening 30, a plurality of electrodes 31 and a regulating tubular valve 32 which coöperates with the discharge opening 29, and is adapted to be raised and lowered in position for determining the height of the electrolyte within the rheostat. The regulating valve 32 is mechanically connected to the piston 5 of the fluid-actuated device 3 by means of a rod 33, whereby the device 3 serves to actuate said regulating valve 32.

The motor 26 is intended to illustrate any form of polyphase induction motor having adjustable secondary resistance, while the switch LS is of the multi-pole type, and is actuated by an electro-magnet 35.

The control of the apparatus is accomplished by means of a master controller $12^a$, of somewhat similar construction to that hereinbefore set forth in connection with Fig. 1, except that the controller $12^a$ is provided with an additional terminal $13^a$ and is adapted to occupy four positions, three of which, marked "Lower", "Hold" and "Raise", establish operative circuit connections, while the fourth or "off" position not only returns the apparatus to its initial position but also disconnects the motor 26 from the source 27 by opening the switch LS.

When it is desired to bring the motor 26 up to speed, the master controller $12^a$ is moved into its "raise" position, thereby establishing a circuit from contact terminal 13 through conducting segment 16ª, contact terminal 13ª, conductor 17ª, energizing coil of electro-magnet 35 and conductor 19 to the auxiliary source of energy B. The energization of the electro-magnet 35 effects the closure of the switch LS, whereby the motor 26 is connected to the source of energy 27. In addition, a circuit is completed from contact terminal 13 which includes conducting segment 16ª, contact terminal 14, conductor 17, energizing coil of the electrically operated valve 7 and conductor 19 to the source B. Thus, the valve 7 is opened to admit operating fluid to the cylinder 4. The electrically operated valve 6 is energized, at the same time, through a circuit from contact terminal 13 which includes conducting segment 16ª, contact terminal 15, conductor 18, energizing coil 10 of the valve 6 and conductor 19 to the source. The valve 6 is thereby closed and permits the release of operating fluid from the upper end of the cylinder 4.

Under these conditions, the piston 5 and regulating valve 32 of the rheostat 25 are raised in position, whereby the level of the electrolyte with the rheostat is correspondingly raised. Thus, the motor secondary resistance is gradually reduced and the motor 26, therefore, speeds up in accordance with well known principles.

When the motor has attained the desired speed, the operator may move the controller 12ª to its "hold" position, thereby disengaging contact terminal 15 from conducting segment 16ª and deënergizing the electrically operated valve 6, whereby said valve is permitted to open to reëstablish balanced pressures acting upon the piston 5. Obviously, the piston 5 and regulating valve 32 are brought to rest and maintained stationary as long as the balanced-pressure conditions are obtained.

The motor speed may be decreased at will by moving the master controller 12ª into its "lower" position, in which both the contact terminals 14 and 15 are disengaged from the conducting segment 16ª and, consequently, the valves 6 and 7 are deënergized and permitted to assume their initial positions whereby operating fluid is admitted above the piston 5 and is released below it, to effect a downward movement of said piston and regulating valve 32. It is manifest that the level of the electrolyte within the rheostat 25 may thus be regulated at will in the manner set forth, and that the speed of the motor 26 may be correspondingly controlled.

The motor 26 may be brought to rest by moving the master controller 12ª to its "off" position, in which the electro-magnet 35 which actuates the switch LS is also deënergized and said switch is permitted to open to disconnect the motor from the source of energy 27.

While we find it particularly convenient and advantageous to employ electrical means for controlling the operation of the fluid-actuated device 3, we also contemplate effecting the control thereof through the agency of mechanical remote-control means and, in Fig. 3, we have illustrated one type of control apparatus which is adapted to perform the necessary functions, although it should be understood that many other forms of mechanical control mechanisms may be employed.

In Fig. 3, the fluid-operated device 3 is similar to those hereinbefore described, except that the valves 6ª and 7ª are of the well known triple-valve type and are mechanically actuated instead of being electrically operated. The valve 6ª is normally open to admit operating fluid into the upper end of the cylinder 4, while the valve 7ª is normally closed to the supply of operating fluid and establishes a communication to the atmosphere. No detailed description of the construction and operation of the valves 6ª and 7ª will be given inasmuch as they are of a form which is employed widely in the art.

Valve 6ª is provided with an operating arm 40 which is connected to a rod 41 having a connection to a bell crank lever 42 that is pivotally mounted upon a stationary support 43, and one arm of which constitutes an operating handle 44. The valve 7ª is similarly provided with an arm 46, a rod 47, a bell crank lever 48 and a handle 49. The valves 6ª and 7ª are normally maintained in the positions shown by means of springs 50 and 51 which are respectively attached to the linkage operating mechanisms.

In order to provide for concurrent operation of a plurality of fluid-operated devices 3, bell-crank levers 53 and 54, and connecting rods 55 and 56 are suitably associated with the respective rods 41 and 47, whereby the operating links of the adjacent fluid operated devices 3 are correspondingly actuated.

An upward movement of the piston 5 may be effected by moving both operating handles 44 and 49 into the positions shown in dotted lines in Fig. 3, thereby cutting off the supply of operating fluid above the piston 5 and permitting its release from the upper end of the cylinder, while operating fluid is admitted to the lower side of the piston. Without further description, it will be understood that the upward movement of the piston 5 may be arrested by again opening the valve 6ª to establish balanced pressure conditions, or the piston may be moved downwardly by effecting the concurrent opening of valve 6ª and closure of valve 7ª.

Various modifications in the structural details and arrangement and location of parts may be effected without departing from the spirit and scope of our invention

We claim as our invention:

1. The combination with a member to be actuated, and electro-pneumatic means for actuating said member and pneumatically biased to a predetermined position, of controlling means adapted to occupy three positions, one for causing said pneumatic means to move said member in one direction, another for arresting the movement thereof in any position, and the last for causing said pneumatic means to move said member in the reverse direction.

2. The combination with a member to be actuated and a fluid-operated device for actuating said member and biased by fluid pressure to a predetermined position, of electric means embodying a master controller having one position for causing said device to actuate said member in one direction, another position for arresting the movement of said member, and a third position for effecting its actuation in the opposite direction.

3. The combination with a member to be actuated and a fluid-operated device for actuating said member, of electrical governing means for said operating device embodying a controller having four positions, one position for admitting operating fluid into one end of said device for moving said member in one direction, another position for admitting operating fluid into the other end of said device for actuating said member in the other direction, another position for concurrently admitting operating fluid into both ends of said device for holding said member at rest, and another position for entirely disconnecting said electrical governing means.

4. The combination with a member to be actuated and a fluid-operated device for actuating said member and having an electrically operated valve at each end thereof, of a master controller for governing the energization of said electrically operated valves and adapted to occupy three positions for respectively energizing one of said valves, both of said valves and neither of said valves.

5. The combination with a member to be actuated and a fluid-operated device for actuating said member and having a plurality of electrically operated valves one of which is normally open and the other normally closed, and a movable piston contained within said device and associated with said member, of a master controller for energizing one of said valves, both of said valves concurrently or neither of said valves, whereby said piston may be moved in either direction or held stationary.

6. The combination with a member to be actuated and a fluid-operated device for actuating said member and having a movable piston therein associated with said member, and a plurality of electrically operated valves for governing the admission of operating fluid to said device, of switching apparatus for energizing one, both or neither of said valves, whereby said movable piston and associated member are actuated in either direction or are held at rest in any position.

7. The combination with a member to be actuated, and a fluid-operated device having a movable piston associated therewith and connected to said member, of a plurality of mechanically independent valves for governing the admission of operating fluid into the respective ends of said device, and remote manually operated means for individually or concurrently controlling said valves to effect the actuation of said piston and connected member in the one or the other direction or for arresting the movements thereof in any position.

8. The combination with a member to be actuated, and a fluid-operated device having a movable piston associated therewith and connected to said member, of a plurality of mechanically independent valves for governing the admission of operating fluid into the respective ends of said device, and manually operated remote-control means for individually or concurrently actuating one or both of said valves for effecting movements of said piston and associated member in the one or the other direction or for holding them at rest in any position.

9. The combination with a member to be actuated, and a fluid-operated device having a movable piston associated therewith and connected to said member, of a plurality of mechanically independent valves for governing the admission of operating fluid into the respective ends of said device, one of said valves being normally open and the other normally closed, whereby said piston and associated member are biased to one direction of movement, and manually operated remote-control means for closing the normally open valve and opening the normally closed valve for moving said piston in the other direction, and for opening both valves for arresting the movement thereof in any position.

10. The combination with a member to be actuated, and a fluid-operated device having a movable piston associated therewith and connected to said member, of a plurality of valves for governing the admission of operating fluid into the respective ends of said device, one of said valves being normally open and the other normally closed, whereby said piston and associated member are biased to one direction of movement, and electrically operated means embodying electromagnets and manually operated switching apparatus for closing the normally open valve and opening the normally closed valve for effecting movements of said piston and said member in the opposite direction, and
5 for opening both of said valves for holding said piston and members at rest in any position.

In testimony whereof, we have hereunto subscribed our names this 25th day of June, 1914.

KARL A. SIMMON.
ARTHUR J. HALL.

Witnesses:
B. B. HINES,
M. C. MERZ.